United States Patent
Skvorecz (12)

(10) Patent No.: US 11,974,681 B2
(45) Date of Patent: May 7, 2024

(54) DEPRESSED PORTAL IN WIRE STAND

(71) Applicant: Robert J. Skvorecz, Kinnelon, NJ (US)

(72) Inventor: Robert J. Skvorecz, Kinnelon, NJ (US)

(*) Notice: Subject to any disclaimer, the term of this patent is extended or adjusted under 35 U.S.C. 154(b) by 217 days.

(21) Appl. No.: 17/561,775

(22) Filed: Dec. 24, 2021

(65) Prior Publication Data

US 2022/0408948 A1  Dec. 29, 2022

Related U.S. Application Data

(60) Provisional application No. 63/214,344, filed on Jun. 24, 2021.

(51) Int. Cl.
*A47G 19/08* (2006.01)

(52) U.S. Cl.
CPC .................. *A47G 19/08* (2013.01)

(58) Field of Classification Search
CPC ...... A47G 19/08; B21F 15/02; A47J 37/0694; A47J 37/01; A47J 37/0704; A47J 36/34; A47J 47/02; A47J 47/14; B65D 25/24
See application file for complete search history.

(56) References Cited

U.S. PATENT DOCUMENTS

| | | | | |
|---|---|---|---|---|
| 1,283,389 A * | 10/1918 | Miles | ....................... | B65D 7/26 211/74 |
| 2,101,487 A * | 12/1937 | Anderson | ............. | A47J 37/108 211/74 |
| 3,160,308 A * | 12/1964 | Hare | .................... | B65D 21/046 206/513 |
| 3,536,000 A * | 10/1970 | Whitehill | .............. | A47J 36/022 99/425 |
| 3,972,318 A * | 8/1976 | Lenoir | .................... | A47J 37/10 D7/354 |
| 4,191,160 A * | 3/1980 | Elliott | ..................... | F24B 1/205 99/450 |
| 5,503,062 A * | 4/1996 | Buff, IV | ................. | A47J 36/22 220/756 |
| 6,341,704 B1 * | 1/2002 | Michel, Jr. | ............. | A47L 19/04 211/119.011 |
| 6,668,708 B1 * | 12/2003 | Swinford | ............ | A47J 37/0694 99/449 |
| 7,267,308 B1 * | 9/2007 | Jenson | .................... | A47J 47/16 248/37.3 |

(Continued)

*Primary Examiner* — Monica E Millner
(74) *Attorney, Agent, or Firm* — Michael J. Feigin, Esq.; Feigin and Fridman LLC

(57) ABSTRACT

A wire pan and interlocking top insert component are disclosed. The wire pan's top side is formed by a closed loop wire, which is connected to the parallelly placed bottom of the wire pan by inwardly sloping wires. Attached to the inwardly sloping wires are frictional clamping flanges and bent wires, which connect opposite inwardly sloping wires. The distance between the frictional clamping flanges and bent wire is substantially equal to the top insert edge wires' diameter. Thus, the top insert can be entered into the spaces between the bent wires and frictional clamping flanges, holding it in place during usage. The majority of the bent wires abut the top insert wire, besides for their central depressions which form portals. These portals are sufficiently wide, in some embodiments, to enter a finger into in order ease the process of the detachment of the top rack from the wire pan.

5 Claims, 5 Drawing Sheets

(56) References Cited

U.S. PATENT DOCUMENTS

| | | | |
|---|---|---|---|
| 7,587,973 B2* | 9/2009 | Kaliveh | A47J 37/0694 |
| | | | 99/449 |
| 9,155,422 B1* | 10/2015 | Wohld | A47J 43/18 |
| 11,197,583 B2* | 12/2021 | Rose | A47J 47/005 |
| 11,564,534 B2* | 1/2023 | Skvorecz | A47J 47/02 |
| 2018/0168394 A1* | 6/2018 | Casternovia | A47J 36/022 |

* cited by examiner

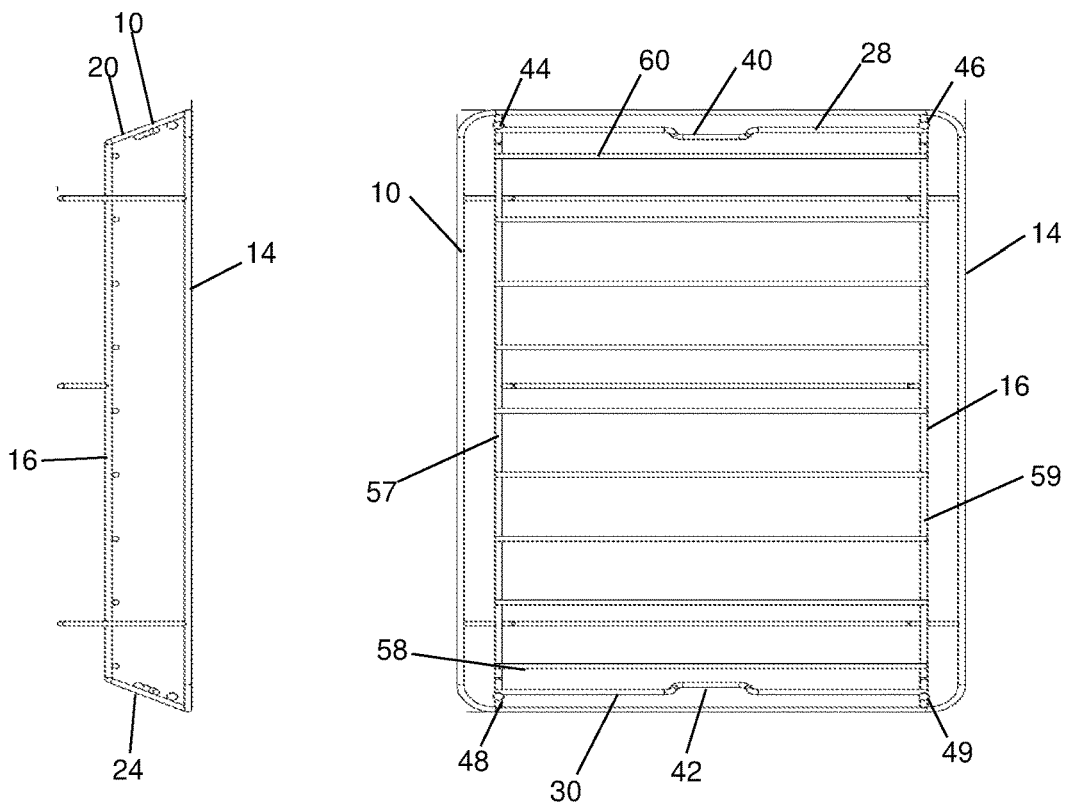
Figure 2
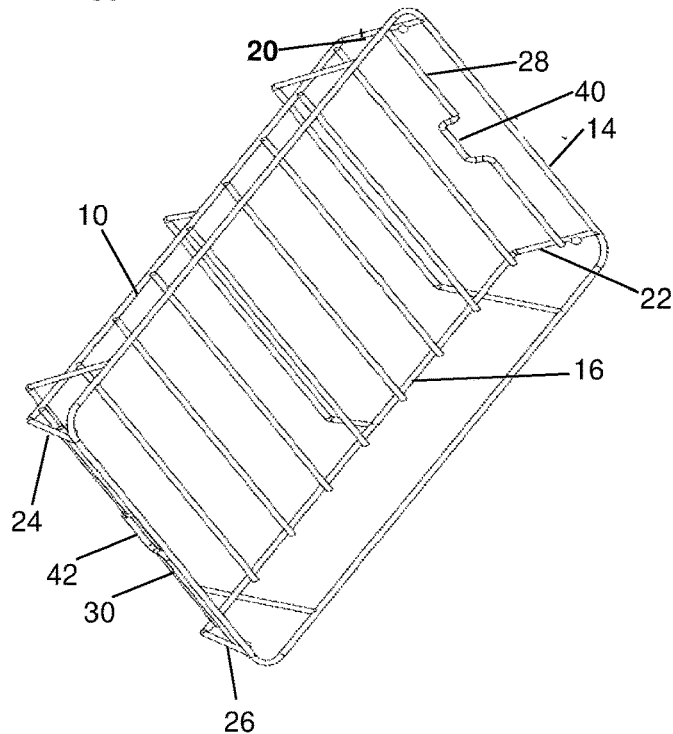
Figure 1
Figure 3

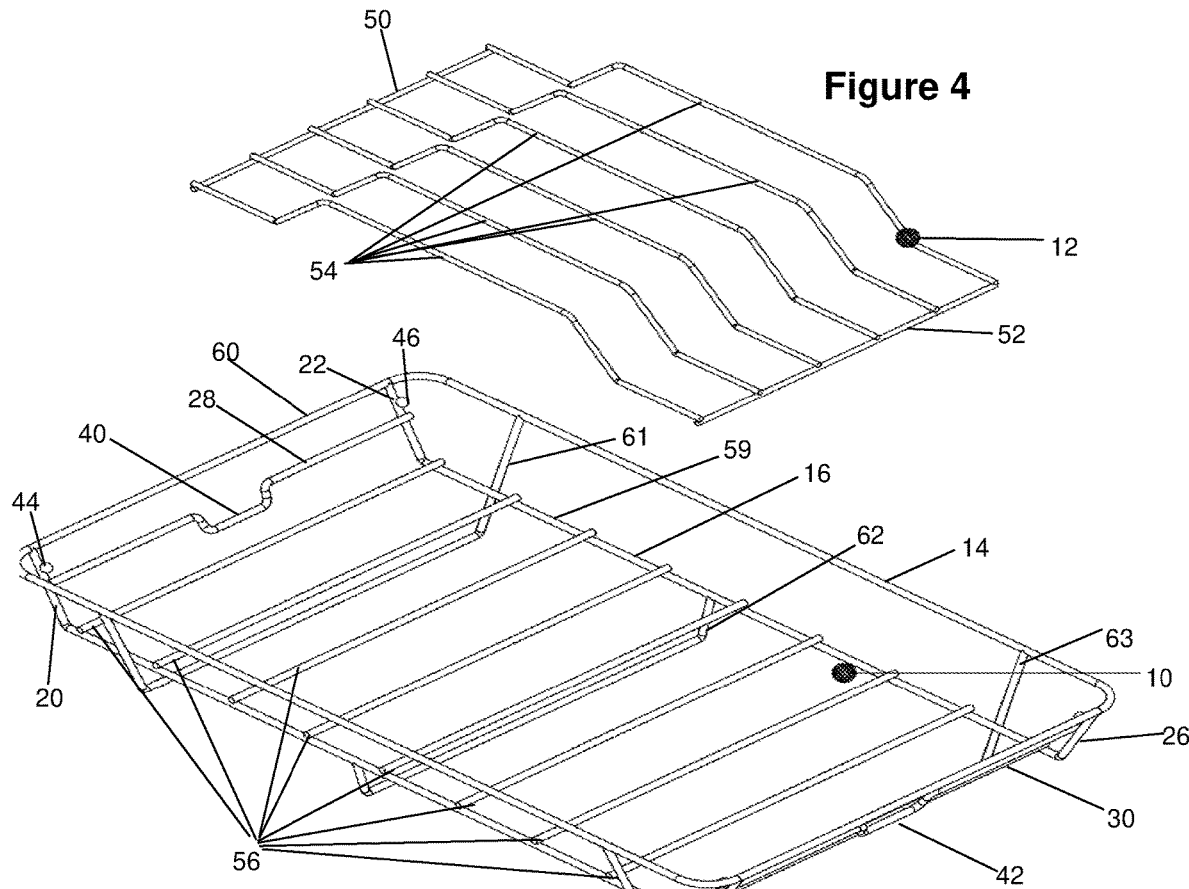
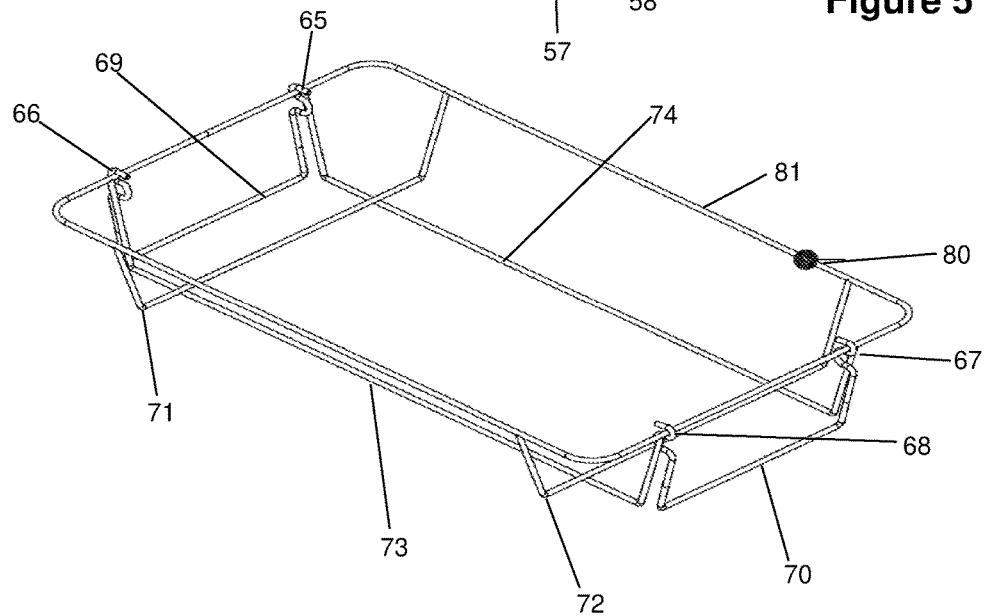

DEPRESSED PORTAL IN WIRE STAND

FIELD OF THE DISCLOSED TECHNOLOGY

The disclosed technology relates generally to roasting pans, and more specifically to a roasting pan which integrates with a foil pan.

BACKGROUND

Wire stands with top inserts are used to orient pans and enable them to be used more efficiently by optimizing their storage abilities. Typically, a stand holds the pan, while an interior wire pan and insert rest inside the pan. This insert is used, for example, to organize food in a way that allows it to be cooked properly. However, these components are not all one piece. They need to be attachable and detachable in order to allow for removal and entry of an insertable pan and its contents. Hence, this necessitates a system by which the pieces can be assembled and disassembled from the larger structure.

When two items are held together against one another, a force must be applied to separate them. However, where gripping the items is difficult and one's finger tips like lack the necessary dexterity to separate two items, such as wires secured together, this causes use of products requiring attachment and separation to be very difficult. Force must be applied from between the two items in order to push them apart. This raises the difficulty, though, of how to enter a tool, a finger, or some other object in between two close objects. The existing technology to address this issue, and particularly with regard to wire stand components, does not adequately address this issue, thereby necessitating the disclosed technology for further developments in this area.

SUMMARY OF THE DISCLOSED TECHNOLOGY

A wire pan has a top rack. The top rack has a closed loop wire, which forms the top side of the wire pan. The wire pan further has a bottom rack, whose largest planar area is parallel to the area enclosed by the top closed loop.

A bent wire is attached to, and extends between, each wire of the first set of inwardly sloping wires. This bent wire can be divided into three portions. The two side portions are straight are parallel to a plane enclosed by the wires of the top closed loop. The central portion has at least one bend forming a central depression between the two straight side components. In some embodiments of the technology, the central depression is formed by four bends and has a depressed, elongated side that is parallel to the wire of the top loop. Angled portions of the bent wire (that is, the bent portions of the wire) connect the central portion to the side portions of the bent wire in embodiments of the disclosed technology.

A wire pan also has two sets of inwardly sloping wires which secure the top loop to the bottom wire pan. Each wire of the first set of inwardly sloping wires may have a frictional, and in some embodiments, spherical clamping flange, which is spaced apart from the bent wire by the diameter, or at least the diameter of the bent wire. The diameter is the distance from one end of the wire through its center which is transverse to the greatest length of the wire. The distance between the two frictional clamping flanges is equal to the minimum length of the opposite end wires of the top rack in embodiments of the disclosed technology. A top rack end wire's abutment of the majority of the bent wire on a side where the two wires are parallel to one another may be facilitated by the securement of the end wire between the two frictional clamping flanges and the bent wire by way of friction.

Embodiments of the disclosed technology and their components can also be described in another way. A top rack with multiple equally spaced apart cross wires are each connected to a first and second end wire. A bottom wire pan has multiple cross wires, whose ends are joined by perpendicular connecting wires. The cross wires of the bottom wire pan are perpendicular to the cross wires of the top rack. Simultaneously, the cross wires of the bottom wire pan are parallel to the spaced apart end wires of the top rack. Inwardly sloping wires connect each of four corner sections of a closed loop to the perpendicular connecting wires of the bottom wire pan. There is at least one bent cross beam connected to adjacent inwardly sloping wires. Frictional clamping flanges are fixedly connected to the inwardly sloping wires. At least one of the pair of top rack end wires removably abuts the majority of the cross beam. The distance between the frictional clamping flanges and the bent wire may be at least equal to the length of the diameter of the top rack end wires. A portal is formed between an end wire and the bent wire. The width of this portal may be greater than the width of an average adult human finger. The width of the portal may be greater than the depth of the portal.

A method of using the devices described above can be carried out as follows. First, an end of the top rack is abutted between the bent wire and a pair of frictional clamping flanges. Subsequently, the same is done with the second end of the top rack and the second pair of frictional clamping flanges. Objects are then placed between the wires of the top rack, such that the objects rest on the wires of the bottom wire pan, which are perpendicular to said wires of said top rack. After usage of the top wire rack with the objects, the top rack can be removed from the bottom wire pan by entering at least one finger into the depression and pulling the top rack the frictional clamping flanges. The force used to free the top rack from the bottom wire pan is applied to counteract and overpower the frictional force of frictional locking mechanism, which is caused by the abutment of the top rack end wires and the bent wire and the frictional clamping flanges.

For purposes of this disclosure, directional indicators are relative to a typical use of the device with respect to a direction of the pull of gravity. Or, the directional indicators can be understood as being relative to each other wherein "top" or "upper" is opposite "bottom" or "lower" and so forth.

"Closed loop" is defined as "a planar region that is circumscribed by a continuous border."

"Continuous" is defined as "without interruption for at least 95% of a given measured length."

"Inwardly sloping" is defined as "positioned at an angle towards a given point, which is within larger, predefined boundaries."

"Wire" is defined as "a prismic structural component, whose length is elongated in relation to the dimensions of the circumference."

"Bent" is defined as "non-linear at, at least a 5 degree angle."

"Plane" is defined as "a surface in which any given plurality of points, lines, or objects wholly lie."

"Depression" is defined as "a cavity formed from a downward extension of component relative to adjacent components or part(s) of a component."

"Central" is defined as "located, in part, within 15% of the total length of the given surface or wire's midpoint."

"Side portions" is defined as "non-central regions of a given object and/or linear region on either side of a bent region."

"Elongated" is defined as "exceeding another dimension of a given object by a factor of at least ten."

"Frictional" is defined as "resistance that one surface or object encounters when moving over another which, in some embodiments, causes two objections at rest to remain at rest while abutting one another"

"Clamping" is defined as "purposefully applying force to at least one object in order to secure its position at least in part based on friction."

"Spherical" is defined as "having one smooth surface on which every point is substantially the same distance from the center of the solid."

"Substantially" is defined as "within 5%."

"Majority" is defined as "more than 50%."

"Abutting" is defined as "causing a face of a solid to lie substantially against a face of another solid, such that the two faces are parallel to one another."

Words describing relative heights, such as "raised", "lowered", "lower", "above", and "below" refer, unless stated otherwise, to the orientation in which the device is typically used, which is, from bottom to top, as follows: wire chafing stand, lower pan, base rack, raised rack, upper pan.

Any device or step to a method described in this disclosure can comprise or consist of that which it is a part of, or the parts which make up the device or step. The term "and/or" is inclusive of the items which it joins linguistically and each item by itself.

BRIEF DESCRIPTION OF THE DRAWINGS

FIG. 1 is a side perspective view of the wire pan in an embodiment of the disclosed technology.

FIG. 2 is a top plan view of the wire pan in an embodiment of the disclosed technology.

FIG. 3 is a bottom and side perspective view of the wire pan in an embodiment of the disclosed technology.

FIG. 4 is a top perspective view of the top insert in an embodiment of the disclosed technology.

FIG. 5 is a top and side perspective view of the wire pan in an embodiment of the disclosed technology.

FIG. 6 is a top and side perspective view of the elevating pan in an embodiment of the disclosed technology.

DETAILED DESCRIPTION OF EMBODIMENTS OF THE DISCLOSED TECHNOLOGY

Figure 7:
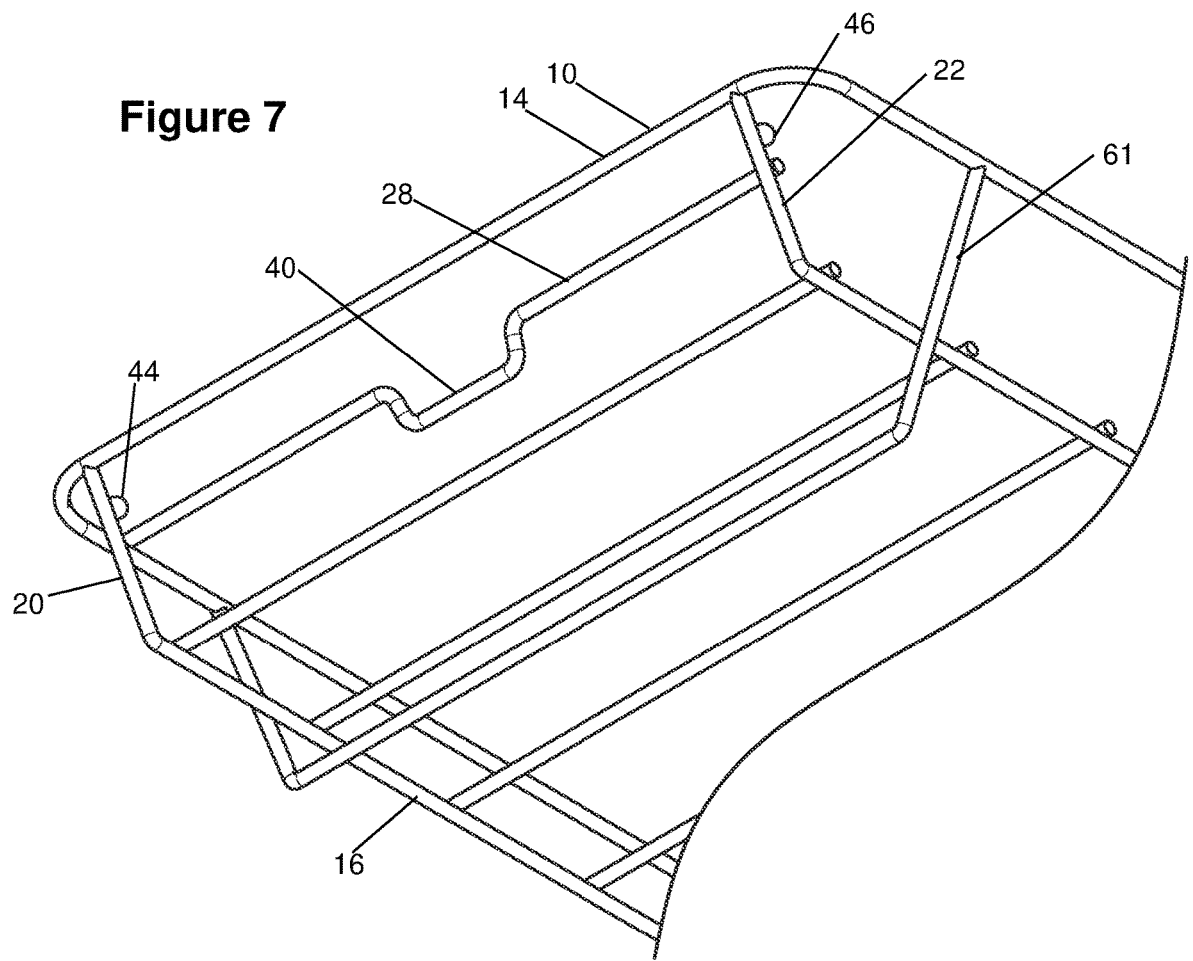
FIG. 7 is a bottom and side perspective view of a portion of the wire pan in an embodiment of the disclosed technology.

A wire pan, top insert, and elevation pan are separable and attachable to one another. The wire pan comprises a top closed loop, bent wires with portals on a side or sides of the wire pan, frictional clamping flanges, inwardly sloping wires connecting the top closed loop to a base/bottom side. The wire pan is restable within an elevation pan such that a top wire loop of each are abutted in some embodiments of the disclosed technology. The elevation pan can have stands, bottom wires, clamps, and hooks. The wire pan is placed into the elevation pan and the two are secured by closing the elevation pan's hooks around the top closed loop of the wire pan in some embodiments of the disclosed technology. The top insert comprises of parallel cross wires, as well as connecting end wires. The top insert end wires are designed to be entered into the space between the wire pan's frictional clamping flanges and bent wire, such that the top insert end wires abut a majority of the wire pan's end wires. Fingers can be placed into the portals in order to detach the top insert from the wire pan which are otherwise frictionally held against each other making disconnection thereof without a tool very difficult but for the portal.

Embodiments of the disclosed technology will become more clear in view of the following description of the figures.

FIG. 1 is a side perspective view of the wire pan 10 in an embodiment of the disclosed technology. A top closed wire loop 14, which is parallel to a bottom rack 16 of the wire pan. Present as well are inwardly sloping wires 20 and 24 which connect the top closed loop 14 and the wires of bottom rack 16.

FIG. 2 is a top plan view of the wire pan 10 in an embodiment of the disclosed technology. The bottom rack 16, have perpendicular edge wires 57, 58, 59, and 60 forming a closed loop are also present. Top closed loop 14 circumscribes an interior space which, in embodiments of the disclosed technology, receives a houses the top insert 12 (see FIG. 4). Bent wires 28 and 30 have central portals 40 and 42 respectively, whose depths, in some embodiments of the disclosed technology, are substantially wider than both an average adult human finger's width and their respective heights. Frictional clamping flanges 44, 46, 48, and 49 are each fixedly connected to an inwardly sloping wire. In some embodiments of the disclosed technology, the frictional clamping flanges are spherical or substantially spherical.

FIG. 3 is a bottom and side perspective view of pan 10 in an embodiment of the disclosed technology. The corner sections of top closed loop 14 are attached to bottom rack 16 by the connecting sloping wires 20, 22, 24, and 26. Bent wires 28 and 30, as well as their respective portals 40 and 42, traverse the rectangle bordered by the sloping wires, the bottom rack connecting wires, and the top closed loop. In some embodiments, the bent wire at the bent section 35 is nearer to perpendicular connecting wires of the bottom rack 16 than the top closed loop 14 of the pan. In this manner, the bent wire 28 (at the depression 40) can be substantially centered between the top closed loop 14 and the pan 10 (at connecting wire 60) for greatest structural support and integrity due to the equidistantly spaced connecting points of the wire 28 between the wires 60 and 14. Further, a trapezoid is formed between the top wire 14, bottom rack 16 (at the connecting wire 60), and inwardly sloping wires.

FIG. 4 is a top perspective view of top insert 12 in an embodiment of the disclosed technology. Parallel spaced apart cross wires 54 are connected to parallel end wires 50 and 52. The distance between each cross wire is substantially equal, thus providing a standard spacing to aid in the ease of use of the product. The diameter of these end wires is the distance between the bent wire and the frictional clamping flanges of the bottom pan.

FIG. 5 is a top and side perspective view of wire pan 10 in an embodiment of the disclosed technology. Bottom rack 16 has parallel cross wires 56 that are surrounded by perpendicular connecting edge wires 57, 58, 59, and 60. Cross wires 56 are perpendicular to cross wires 54 of top insert 12 in FIG. 4. Every cross wire is spaced at a substantially equal distance from one another to contribute to structural integrity. Bottom rack 16 is joined to the parallel top closed loop 14 by inwardly sloping wires 20, 22, 24, and 26. These components form the outer boundary of the pan, thus defining the space surrounded by these components as interior space, whilst the area outside these components is exterior space. Described another way, "interior" refers to, or is defined as, within a space bounded by a wire or wires. "Exterior" refers to or is defined as "outside of a space bounded by a wire or wires" being described or referenced in context to the word "exterior". Bent wires 28 and 30 function as cross beams, respectively connecting two inwardly sloping wires to one another. Bent wires 28 and 30 have central depressions that form portals 40 and 42 respectively. Fixedly attached to the inwardly sloping wires are frictional clamping flanges 44 and 46, as well 48 and 49. The distance between the clamping flanges and their adjacent end wires is substantially equal to the diameter of the top rack insert end wires. Thus, the top insert (when inserted) is held in place while at rest or during normal usage of the device, such as when grilling.

FIG. 6 is a top and side perspective view of the elevation pan 80 in an embodiment of the disclosed technology. Bottom wires 73 and 74 as well as stands 71 and 72 support the pan, allowing it to maintain its position. Clamps 69 and 70 are connected to upper rim 81 by hooks 65 and 66 as well as 67 and 68 respectively. Once wire pan 10 is lowered into the internal cavity of pan 80, the clamps swing around rim 81 in order to secure the two devices to each other, providing support to pan 10.

FIG. 7 is a bottom and side perspective view of wire pan 10 in an embodiment of the disclosed technology. Pictured are inwardly sloping wires 20 and 22, bent wire 28 with a central depression forming portal 40, frictional clamping flanges 44 and 46, bottom rack 16, and top closed loop 14. Stand 61 protrudes from top closed loop 14 at two opposite sides of the loop, slopes downwards at an angle, and transverses the length of lower rack 16 beneath the surface of lower rack 16.

Figure 8:
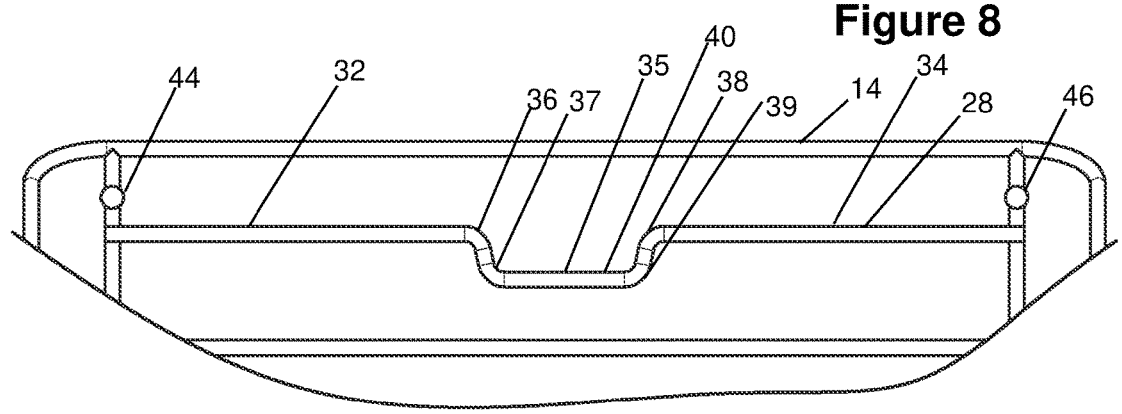
FIG. 8 is a side elevation view of the wire pan in an embodiment of the disclosed technology.

FIG. 8 is a side elevation view of pan 10 in an embodiment of the disclosed technology. Top closed loop 14 and frictional clamping flanges 44 and 46 are shown. Bent wire 28 comprises three separate regions: side portion 32, side portion 34, and central portal 40. Central portal 40 is formed from a depression of the wire that has four bends: 36, 37, 38, and 39. Between two bends on either side is portal section 35 which comprises a substantially straight wire which is parallel to side portions 32 and 34, as well as top closed loop 14.

Figure 9:
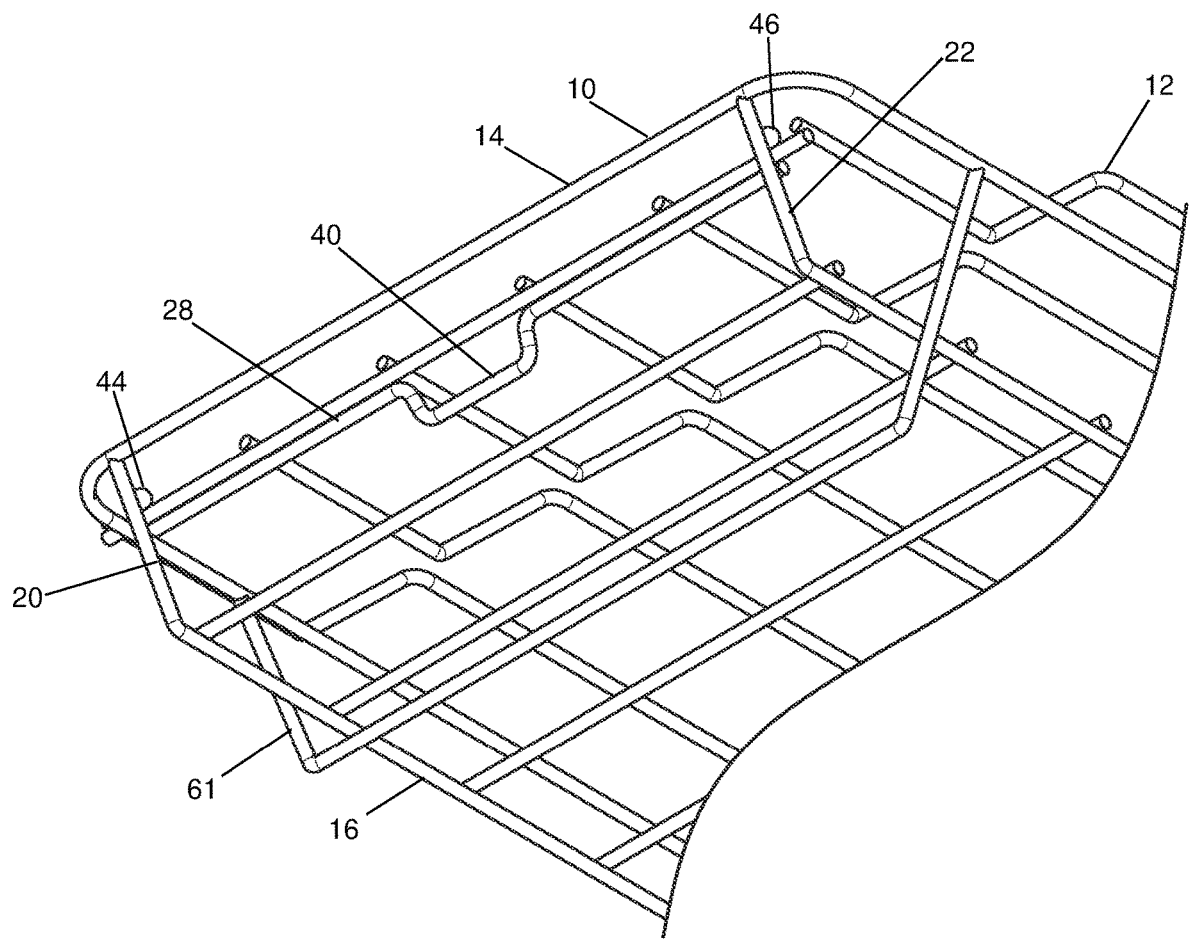
FIG. 9 is a bottom side perspective view of a portion of the wire pan and top insert in an embodiment of the disclosed technology.

FIG. 9 is a bottom side perspective view of a portion of wire pan 10 and top insert 12 in an embodiment of the disclosed technology. Top rack end wire 50 abuts a majority of bent wire 28. The two are held in place against one another by frictional clamping flanges 44 and 46 which are situated on inwardly sloping wires 20 and 22 respectively. Between the two wires is portal 40. The distance between the clamping flanges and their adjacent end wires is substantially equal to the diameter of the top rack insert end wires. This enables the top insert 12 and wire pan 10 to be snugly held in place against each other, upon activation of the frictional securement mechanism by entering top insert 12 into the space between the bent wire and the frictional clamping flanges. Stand 61 enables the device to stand on the ground. Bottom rack 16 and top closed loop 14 are parallel to one another, enhancing the symmetry of the product.

Figure 10:
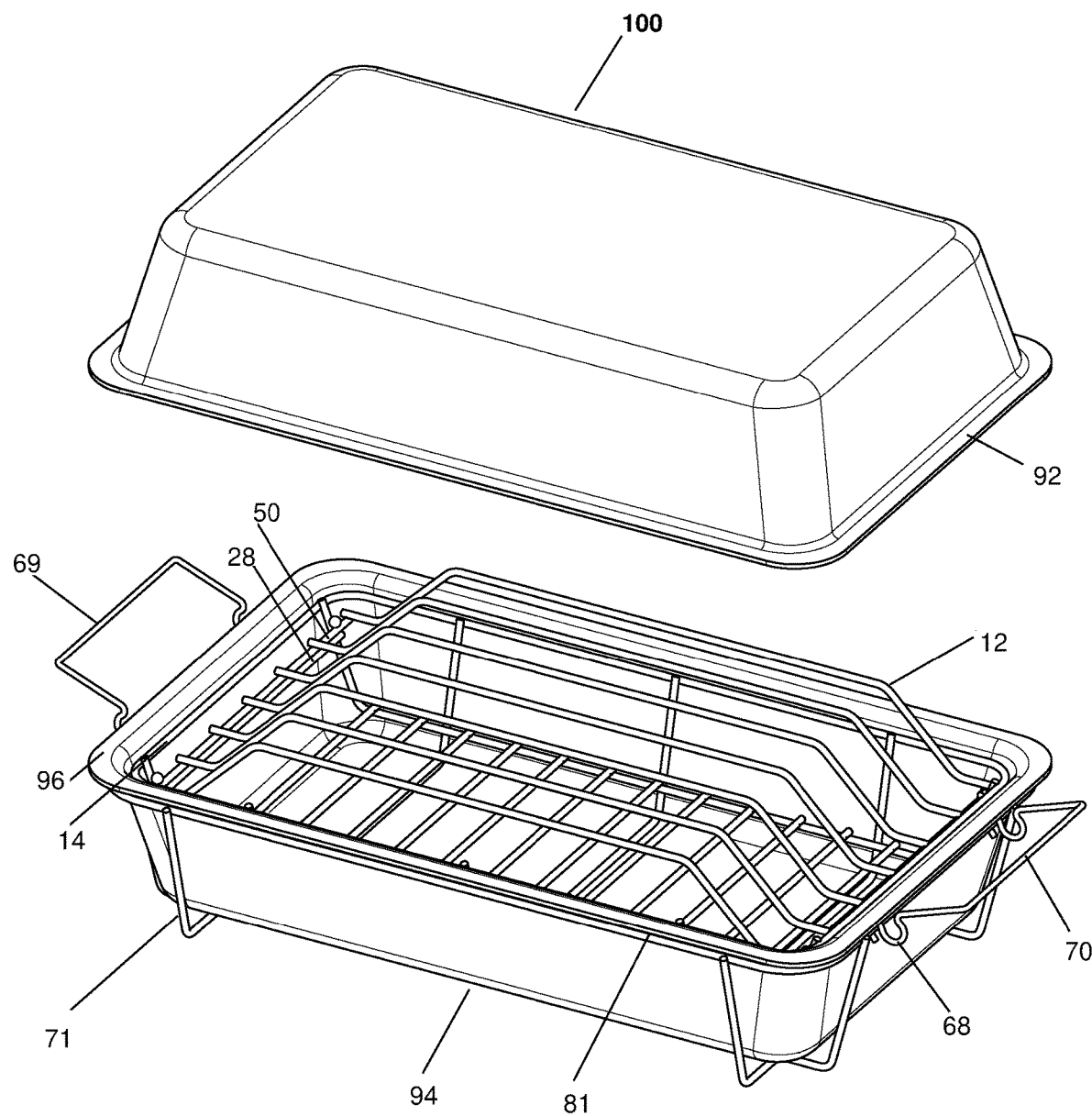
FIG. 10 is a partially-exploded perspective view of elevation pan 80, insertable pan, wire pan, top insert, and pan cover.

FIG. 10 is a partially-exploded perspective view of elevation pan 80, insertable pan 94, wire pan 10 (see FIG. 5), top insert 12, and pan cover 100. The insertable pan 94 fits within the elevation pan 80. The wire pan 10 and top insert 12 fit inside the insertable pan 94, with top rack opposite end wires 50 and 52 lying on bent wire 28.

The upper pan 100 is of a height such that when it is placed, in the orientation shown, such that the pan rims 92 and 96 are substantially in contact with each other, the whole of wire pan 10 and top insert 12 fit within a cavity between the pans 100 and 94. The top insert 12 is also somewhat flexible. That is, opposite corners are bendable and non-permanently deformable such that they are closer together above or below a horizontal plane of the top insert. In this manner, top insert 12 can be placed in wire pan 10 by way of slightly deforming the top insert and then allowing the deforming to be undone so that the top insert fits in snugly (friction at all corners and/or all sides) above the wire pan or within the pan rims 92 and/or 96.

The walls of insertable pan 94 abut the bent wires 28 and 30 and portals 40 and 42 when wire pan 10 and top insert 12 are placed into pan 94. This abutment prevents a user from entering their finger into portals 40 or 42 and latching their finger around top rack end wires 50 and 52. Thus, when the device is fully assembled with an insertable pan 94 in which the bottom wire pan 10 sits within/is surrounded thereby, the top insert 12 is prevented from being removed from the wire pan 10. This is due to the frictional securement of the two to each other whose release mechanism is unreachable usable under such conditions.

Clamps 69 and 70 are rotatable into a position such that they frictionally secure insertable pan 94 to elevating pan 80. Thus, the entire device is transportable and useable as one piece, every component being securely fixed to the other components respectively.

The disclosed technology is intended to allow for the repeated securement and subsequent detachment of top insert 12 to/from wire pan 10. For securement, the top insert 12 is grasped and lowered into the area enclosed by top closed loop 14 such that cross wires 54 are perpendicular to cross wires 56. Top insert 12's cross wire 50 is inserted into the space between bent wire 28 and frictional clamping flanges 44 and 46, such that end wire 50 abuts a majority of bent wire 28. Top insert 12's end wire 52 is inserted into the space between bent wire 30 and frictional clamping flanges 48 and 49, such that end wire 52 abuts a majority of bent wire 30. Top insert 12 is now frictionally held in position. For detachment, one or two fingers are entered into portal 40 and curled around end wire 50. End wire 50 is pulled up and away from the adjacent frictional camping flanges and inwardly sloping wires. Then, one or two fingers are entered into portal 42 and curled around end wire 52. End wire 52 is pulled up and away from the adjacent frictional camping flanges and inwardly sloping wires. This process is intended to be repeatable during repeated usages of the technology.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A wire pan system comprising:
a top rack having a plurality of substantially equally spaced apart cross wires, each connected to a first end wire and to a second end wire;
a bottom wire pan with a plurality of cross wires, whose ends are joined by perpendicular connecting wires, wherein said cross wires of said bottom wire pan are perpendicular to said plurality of cross wires of said top rack and said plurality of cross wires of said bottom wire pan are parallel to said spaced apart end wires of said top rack;
a closed loop wire having four corner sections;
inwardly sloping wires connecting each of said four corner sections of said closed loop wire to said perpendicular connecting wires of said bottom wire pan;
at least one bent wire cross beam connecting two of said inwardly sloping wires;
frictional clamping flanges fixedly connected to said inwardly sloping wires;
at least one of said first and said second end wires of said top rack removably abutting a majority of one of said at least one bent wire cross beam;
a portal formed between at least one of said first and said second end wire and said bent wire;
an elevation wire pan, said elevation pan formed, at least in part, from oppositely placed, parallel disposed stands, a rim which is a closed wire loop, and clamps;
said clamps comprising hooks which rotatably connect to said rim;
a solid, non-wire pan sized to fit into said cavity inside said elevation pan;
wherein said wire pan is sized to fit into a cavity of said elevation pan, said cavity being defined formed within said oppositely placed parallel disposed stand, and said closed wire loop;
wherein said clamps each comprise a curvature located adjacent to each of said hooks respectively;
wherein said clamps rotate such that saod curvatures encircle a lip of said solid pan;
upon said encirclement, said solid pan is fixedly attached to said elevation stand; and
wherein said solid pan covering and side of said portal opening to an exterior said bottom wire pan.

2. The wire pan system of claim 1, wherein a shortest distance between said frictional clamping flanges and said bent wire is substantially equal to a diameter of said first and second end wires of said top rack.

3. The wire pan system of claim 1, wherein a width of said portal is substantially greater than one average adult human finger.

4. The wire pan system of claim 1 wherein said a width of said portal is greater than a depth of said portal.

5. The wire pan of claim 1 wherein said central depression is inaccessible from an exterior side of said bottom pan, said exterior side being defined by a part of said top closed loop, said bent wire, and one of said perpendicular connecting wires.

* * * * *